Patented Oct. 5, 1948

2,450,456

UNITED STATES PATENT OFFICE 2,450,456

CONCENTRATED APPLE JUICE AND MILK MODIFIER

Huston St. Clair, Tazewell, Va., assignor to Ridgewood Inc., Winchester, Va., a corporation of Virginia No Drawing. Application May 3, 1945, Serial No. 591,849

10 Claims. (Cl. 99—54)

1

This invention relates to modified cow's milk for feeding to infants and children and more particularly to an improved milk modifier for adding to cow's milk for this purpose.

As is well known the purpose or function of a modifier for cow's milk is to dilute or reduce the protein and fat content of the milk to a value approximating that of human mother's milk and at the same time to add to the cow's milk a sufficient amount of easily digestible sugar such as dextrose or maltose to raise the concentration of the sugar in the diluted cow's milk to the proper value corresponding approximately to the sugar content of human mother's milk.

Prior to the present invention cow's milk modifiers have consisted essentially of sugar syrups such as ordinary corn syrup or dextrin-maltose syrups. These prior milk modifiers however are subject to the disadvantages, among others, that they are very difficult to dissolve in cold or refrigerated milk and also tend to form coarse grained and difficultly digestible curds in the milk.

These disadvantages of the milk modifiers of the prior art are completely or largely overcome by the cow's milk modifier of the present invention which also possesses a number of other very important advantages over the prior products as will become evident from the description of the product of the present invention and its method of preparation as hereinafter set forth.

Among these important additional advantages of the modifier product of the present invention are: its property of overcoming the normal constipating effect of cow's milk, its beneficial effect in overcoming secondary anaemia by providing iron and copper in effective and substantially stable form in sufficient amounts for the purpose of raising the blood hemoglobin toward normal; and its relatively high normal or average vitamin C content in substantially stable condition under normal conditions of storage handling and use, even over a period of several months.

The cow's milk modifier of the present invention is prepared from fresh or uncooked substantially ripe apples preferably in accordance with the following preferred method:

Example

The fresh (uncooked) whole ripe apples are first cleaned, if not already clean, by washing in water and then chopped or sliced into pieces of suitable size and the juice pressed out in any suitable manner as by means of an ordinary cider press or continuous type screw press. The expressed juice is then clarified by using a filter aid such as clay-like materials well known in the art and available on the market.

The clarified juice is then concentrated by evaporation at a temperature of about 140° F. under reduced atmospheric pressure corresponding to about 26 inches to about 27 inches (mercury barometric pressure) in a vacuum pan preferably constructed of copper.

Evaporation under these conditions is continued until the concentrated apple juice acquires a density or specific gravity corresponding to not less than about 68° Brix to not more than about 75° Brix.

The fruit acids normally contained in the concentrated juice are next partially neutralized with milk of lime sufficient to raise or increase the normal pH of the concentrated juice to a pH of not less than about 4.5 and not more than about 5.5 and preferably about 5 as determined by means of the Beckman glass electrode pH meter (which is well known in the art and is available on the market) at ordinary room temperatures or about 68° F.

The product resulting from the above method is ready for use as a cow's milk modifier for modifying cow's milk for feeding infants (young babies) or children and I have found, surprisingly, by suitable tests, and notwithstanding the several processing treatments of the original unconcentrated, un-neutralized juice involved in the process, that the final product contains substantially all of the vitamin C which is normally present in the natural, unconcentrated and un-neutralized apple juice and that the vitamin C is present in the final product in substantially stable condition under normal conditions of storage, handling and use.

I have also found the same to be substantially true of vitamin $B_1$ and of the nutrient minerals such as iron and copper and also of the pectins which are normally present in the natural untreated apple juice, except that the stability of the vitamin $B_1$ content sometimes does not extend over so long a period of time as in the case of vitamin C.

The normal or average vitamin C content of my improved milk modifier corresponds to about 29 milligram per cent (milligram per cent equals milligrams per 100 cc. of concentrate) when freshly prepared and seldom falls below 26.5 milligram per cent (or 91.4% of its original content) after three months storage under average refrigerating conditions or below 24 milligram per cent or 82.75% of its original content when stored for the same period of time at average or normal room temperatures.

The normal or average vitamin C content of the freshly concentrated apple juice prepared in accordance with the above described method prior to partial neutralization of the fruit acids is about 29.3 milligram per cent and about 29.2 milligram per cent after partial neutralization; and correspondingly the vitamin $B_1$ content of the freshly concentrated apple juice before partial neutralization is about 0.8 microgram per cent and after partial neutralization is about 0.75 microgram per cent.

One of the most important features of the improved milk modifier of the present invention is the critical range of its pH value of not less than about 4.5 and not more than about 5.5 with an optimum value of about 5, as determined by the pH meter as specified in the above example of the preferred method.

In this connection I have discovered that if the pH of my improved milk modifier is increased above about 5.5 the vitamins become destabilized or decomposed with the development of an undesirable color and taste in the concentrate and that below a pH of about 4.5 the modifier tends rapidly to produce coarse indigestible curds of sticky or rubber-like consistency.

Another feature of my improved milk modifier is its critical range of concentration corresponding to a density of not less than about 68° Brix and not more than about 75° Brix. Below this range of concentration there is a tendency toward the development of bacterial or fungus growths in the finished product and above this range of concentration the product becomes too viscous for ordinary handling and there is a tendency toward decomposition due to overheating because of faulty circulation in the vacuum pan during the final stages of its preparation.

I have also found that if my modified milk modifier is made by evaporation at a temperature above about 160° F. the final product tends to form a jelly and there is also a strong tendency toward the de-stabilization or rapid decomposition of the vitamins contained in the product.

It is to be understood that the method of making my improved milk modifier is not limited to the details of the above described specific example but that various changes may be made therein without departing from the true scope of my invention.

Thus for instance the temperature of concentration or evaporation may be considerably lower than 140° F. as specified in the example down to a temperature at which the rate of evaporation becomes objectionably slow; and it may also be increased, of course, up to the critical limiting temperature of about 160° F. as previously explained.

Also I may substitute dilute sodium hydroxide or other similar basic neutralizing agents for the milk of lime for partially neutralizing the fruit acids to the critical pH range of the final milk modifier as specified above.

Likewise I may use a stainless steel or glass lined vacuum pan in place of the copper vacuum pan mentioned in the specific example.

Still other permissible variations may be made in the above illustrative specific example of the preferred method of making my improved milk modifier without departing from the true scope of my invention as will be readily understood by those skilled in the art.

I claim:

1. A cow's milk modifier comprising the concentrates, partially neutralized natural juice of fresh apples having a pH of not less than about 4.5 and not more than about 5.5 as determined by the glass electrode pH meter, the concentrated juice being a viscous fluid readily soluble in cold cow's milk and having a density of not less than about 68° Brix and not more than about 75° Brix.

2. The method of making a modifier for modifying cow's milk for feeding to infants and children which comprises expressing the juice from fresh apples, concentrating the expressed juice by evaporation at a temperature not substantially higher than about 160° F. until the concentrate has a density of not less than about 68° Brix and not greater than about 75° Brix, then neutralizing a portion of the fruit acids normally present in the juice to increase the normal pH of the concentrated juice to a pH of not less than about 4.5 and not more than about 5.5 as determined by the glass electrode pH meter, whereby a concentrated syrupy fluid modifier is formed which is readily soluble in normally refrigerated cow's milk and which contains substantially all the vitamins normally present in the natural unconcentrated apple juice in a substantially stable condition under normal conditions of storage, handling and use.

3. The method of making a modifier for modifying cow's milk for feeding to infants and children which comprises expressing the juice from whole fresh apples, clarifying the expressed juice and concentrating it by evaporation at a temperature not substantially higher than about 160° F. under reduced atmospheric pressure until the concentrate has a density of not less than about 68° Brix and not greater than about 75° Brix, then neutralizing a portion of the fruit acids normally present in the juice to increase the normal pH of the concentrated juice to a pH of not less than about 4.5 and not more than about 5.5 as determined by the glass electrode pH meter, whereby a concentrated syrupy fluid modifier is formed which is readily soluble in normally refrigerated cow's milk and which contains substantially all the vitamins and nutrient minerals normally present in the natural unconcentrated apple juice in a substantially stable condition under normal conditions of storage, handling and use.

4. The method of making a modifier for modifying cow's milk for feeding to infants and children which comprises expressing the juice from whole fresh apples, clarifying the expressed juice and concentrating it by evaporation at a temperature not substantially higher than about 160° F. under reduced atmospheric pressure until the concentrate has a density of not less than about 68° Brix and not greater than about 75° Brix, then neutralizing a portion of the fruit acids normally present in the juice to increase the normal pH of the concentrated juice to a pH of not less than about 4.5 and not more than about 5.5 as determined by the glass electrode pH meter, whereby a concentrated syrupy fluid modifier is formed which is readily soluble in normally refrigerated cow's milk and which contains substantially all the vitamins, pectins and nutrient minerals normally present in the natural unconcentrated apple juice in a substantially stable condition under normal conditions of storage, handling and use.

5. A modified cow's milk for feeding to infants and children, comprising cow's milk and a concentrated partially neutralized juice of fresh apples having a pH value of from about 4.5 to about 5.5 inclusive as determined by the glass electrode pH meter, said concentrated juice being a viscous fluid readily soluble in cold cow's milk and having a density of from 68° Brix to 75° Brix inclusive.

6. A cow's milk modifier comprising the concentrated partially neutralized juice of fresh apples having a pH value from about 4.5 to about 5.5 inclusive as determined by the glass electrode pH meter, the concentrated juice being a viscous fluid readily soluble in cold cow's milk and having a density of from 68° Brix to 75° Brix inclusive and containing substantially all of the vitamin C originally contained in the unconcentrated apple juice in a substantially stable condition whereby losses of vitamin C over about 17.25% are not incurred during storage at average room temperatures for a period of three months.

7. A cow's milk modifier comprising the concentrated partially neutralized juice of fresh apples having a pH value of about 5 as determined by the glass electrode pH meter, the concentrated juice being a viscous fluid readily soluble in cold cow's milk and having a density of from 68° Brix to 75° Brix inclusive and containing substantially all of the vitamin C originally contained in the unconcentrated apple juice in a substantially stable condition whereby losses of vitamin C over about 17.25% are not incurred during storage at average room temperatures for a period of three months.

8. A modified cow's milk for feeding to infants comprising cow's milk and a concentrated partially neutralized juice of fresh apples having a pH value of from about 4.5 to about 5.5 inclusive as determined by the glass electrode pH meter, said concentrated juice being a viscous fluid readily soluble in cold cow's milk and having a density of from 68° Brix to 75° Brix inclusive and the proportion of said concentrated juice to the milk being substantially that required to raise the sugar proportion in the cow's milk to correspond approximately to the sugar proportion in human mother's milk.

9. The method of preparing a modified cow's milk for feeding to infants which comprises expressing the juice from fresh apples, concentrating the expressed juice by evaporation at a temperature not substantially higher than about 160° F. until the concentrate has a density of not less than about 68° Brix and not greater than about 75° Brix, then neutralizing a portion of the fruit acids normally present in the juice to increase the normal pH of the concentrated juice to a pH of not less than about 4.5 and not more than about 5.5 as determined by the glass electrode pH meter, whereby a concentrated syrupy fluid modifier is formed which is readily soluble in normally refrigerated cow's milk and which contains substantially all the vitamins normally present in the natural unconcentrated apple juice in a substantially stable condition under normal conditions of storage, handling and use, and incorporating such modifier with cow's milk.

10. The method of preparing a modified cow's milk for feeding to infants which comprises expressing the juice from fresh apples, concentrating the expressed juice by evaporation at a temperature not substantially higher than about 160° F. until the concentrate has a density of not less than about 68° Brix and not greater than about 75° Brix, then neutralizing a portion of the fruit acids normally present in the juice to increase the normal pH of the concentrated juice to a pH of not less than about 4.5 and not more than about 5.5 as determined by the glass electrode pH meter, whereby a concentrated syrupy fluid modifier is formed which is readily soluble in normally refrigerated cow's milk and which contains substantially all the vitamins normally present in the natural unconcentrated apple juice in a substantially stable condition under normal conditions of storage, handling and use, and dissolving a proportion of such modifier in cow's milk to raise the proportion of sugar in such milk to approximately that contained in human mother's milk.

HUSTON ST. CLAIR.

REFERENCES CITED

The following references are of record in the file of this patent:

UNITED STATES PATENTS

| Number | Name | Date |
|---|---|---|
| 2,392,093 | Laird | Jan. 1, 1946 |

OTHER REFERENCES

"Fruit Juice Concentrates," by J. H. Irish Bulletin 392, Sept. 1925, Revised June 1931, University of California Printing Office, Berkeley, Calif., pages 5 to 13 only.

U. S. Dept. of Agriculture Farmers' Bulletin No. 1264, published May 1922, Washington, D. C., pages 50 to 53.

Certificate of Correction

Patent No. 2,450,456. October 5, 1948.

HUSTON ST. CLAIR

It is hereby certified that error appears in the printed specification of the above numbered patent requiring correction as follows:

Column 4, lines 4 and 5, claim 1, for the word "concentrates" read *concentrated*; and that the said Letters Patent should be read with this correction therein that the same may conform to the record of the case in the Patent Office.

Signed and sealed this 28th day of December, A. D. 1948.

[SEAL]

THOMAS F. MURPHY,
*Assistant Commissioner of Patents.*